G. MUELLER.
BAKER'S OVEN.
APPLICATION FILED AUG. 23, 1920.
1,413,867.
Patented Apr. 25, 1922.
4 SHEETS—SHEET 1.
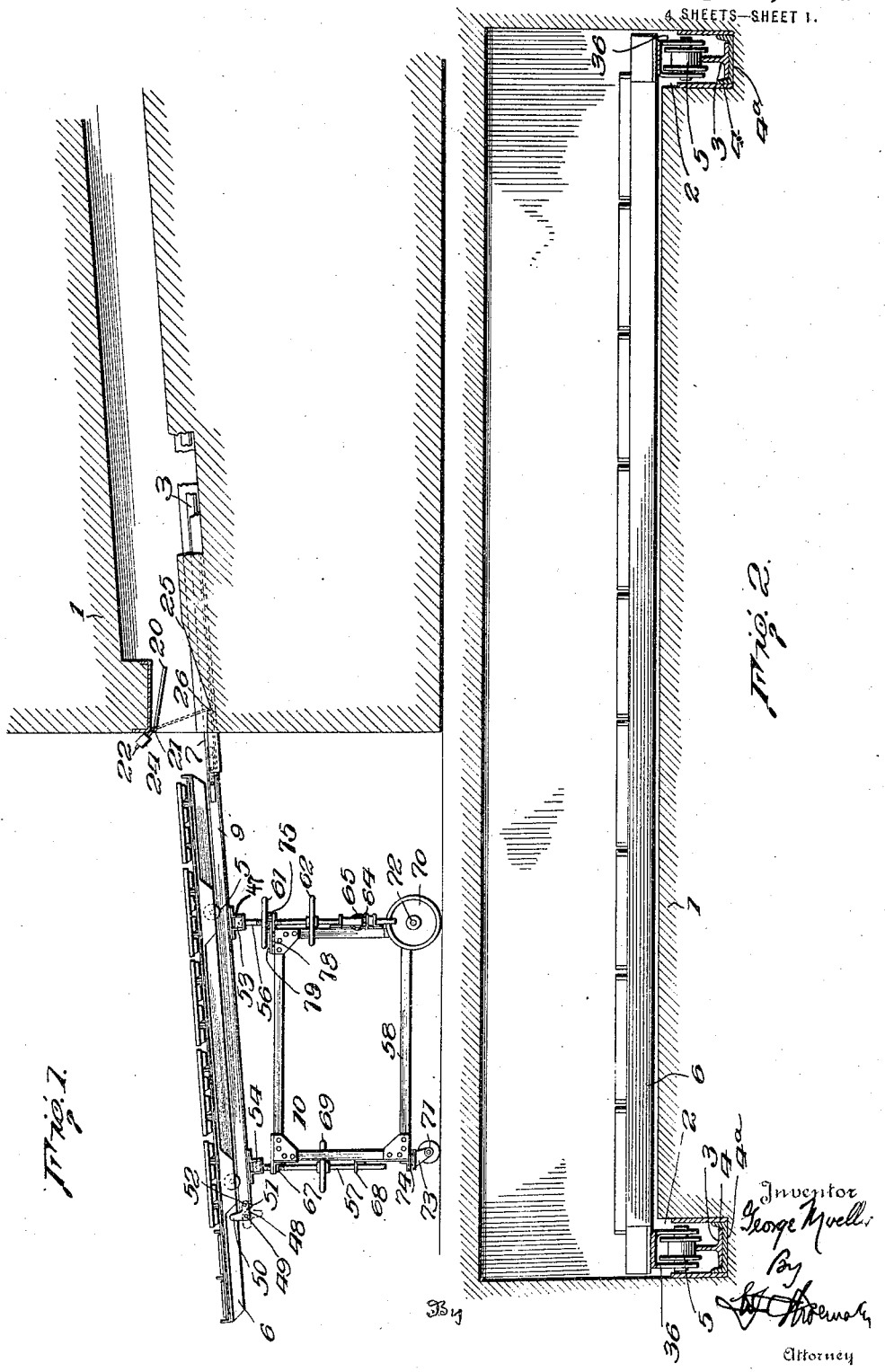

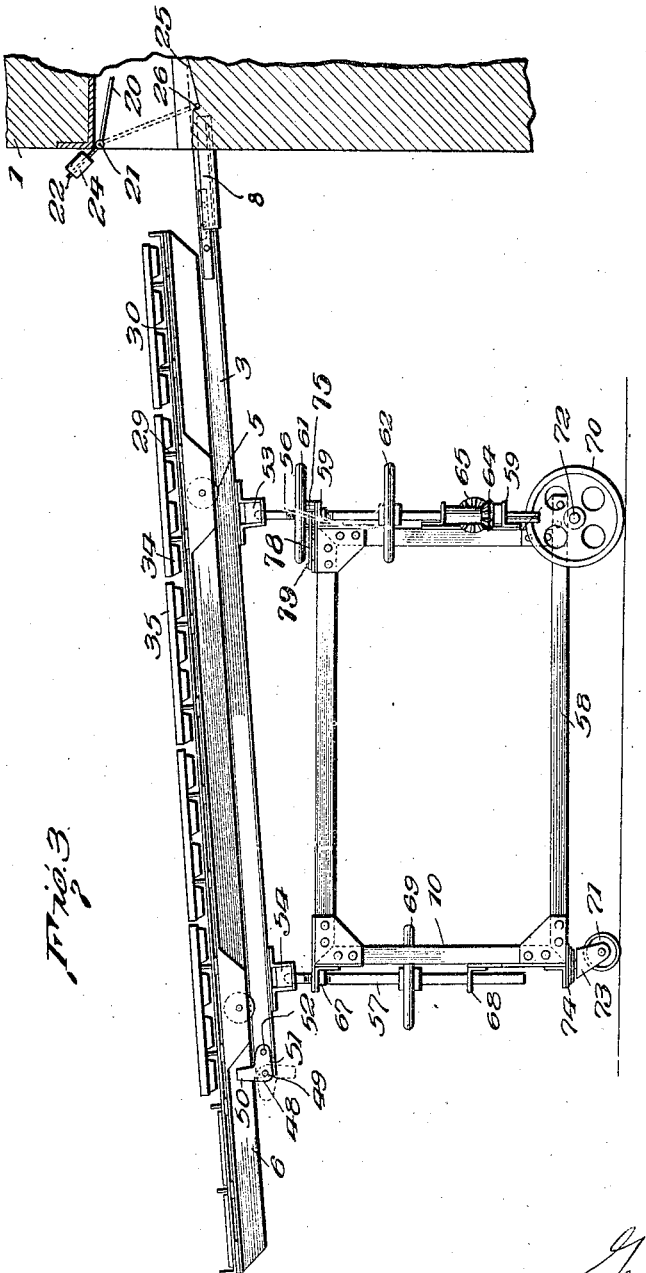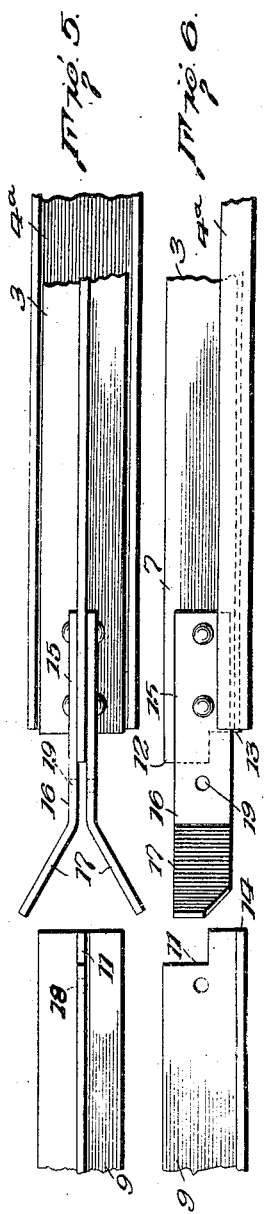

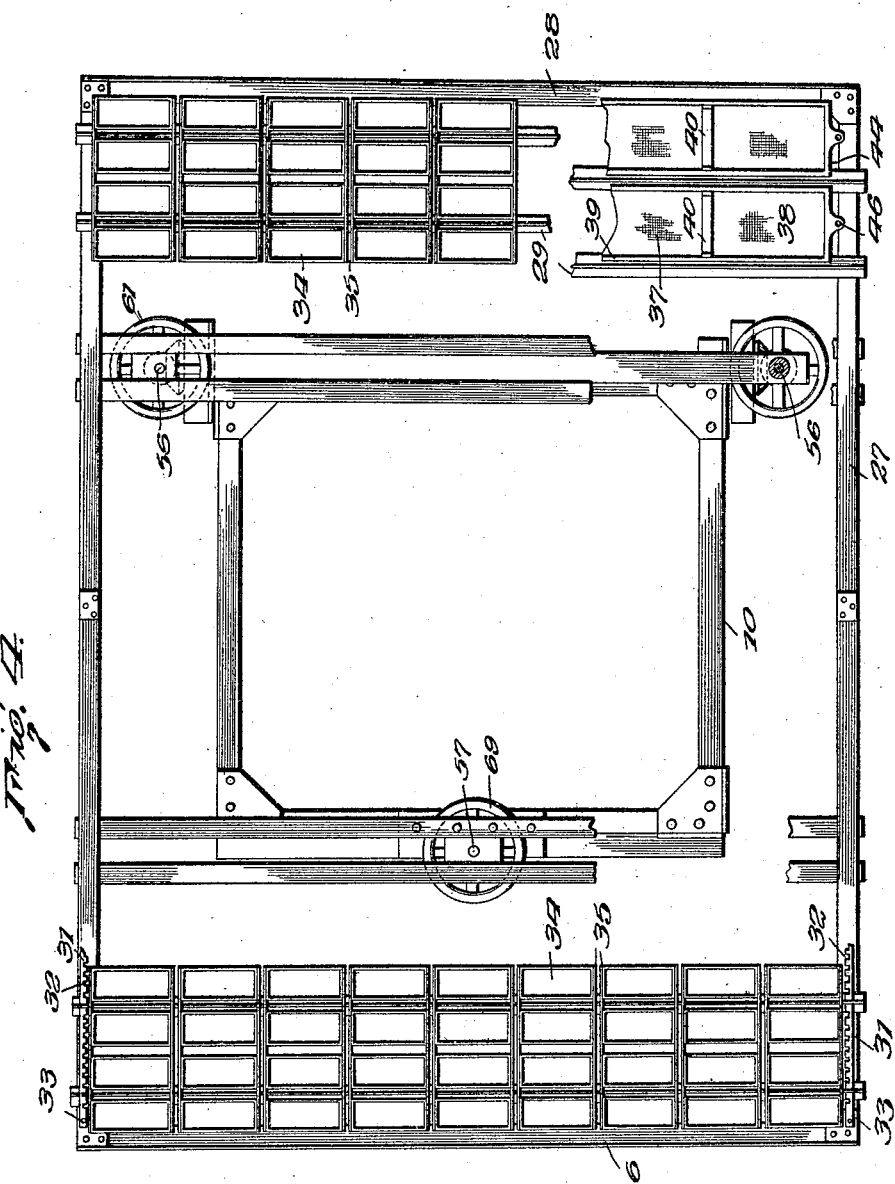

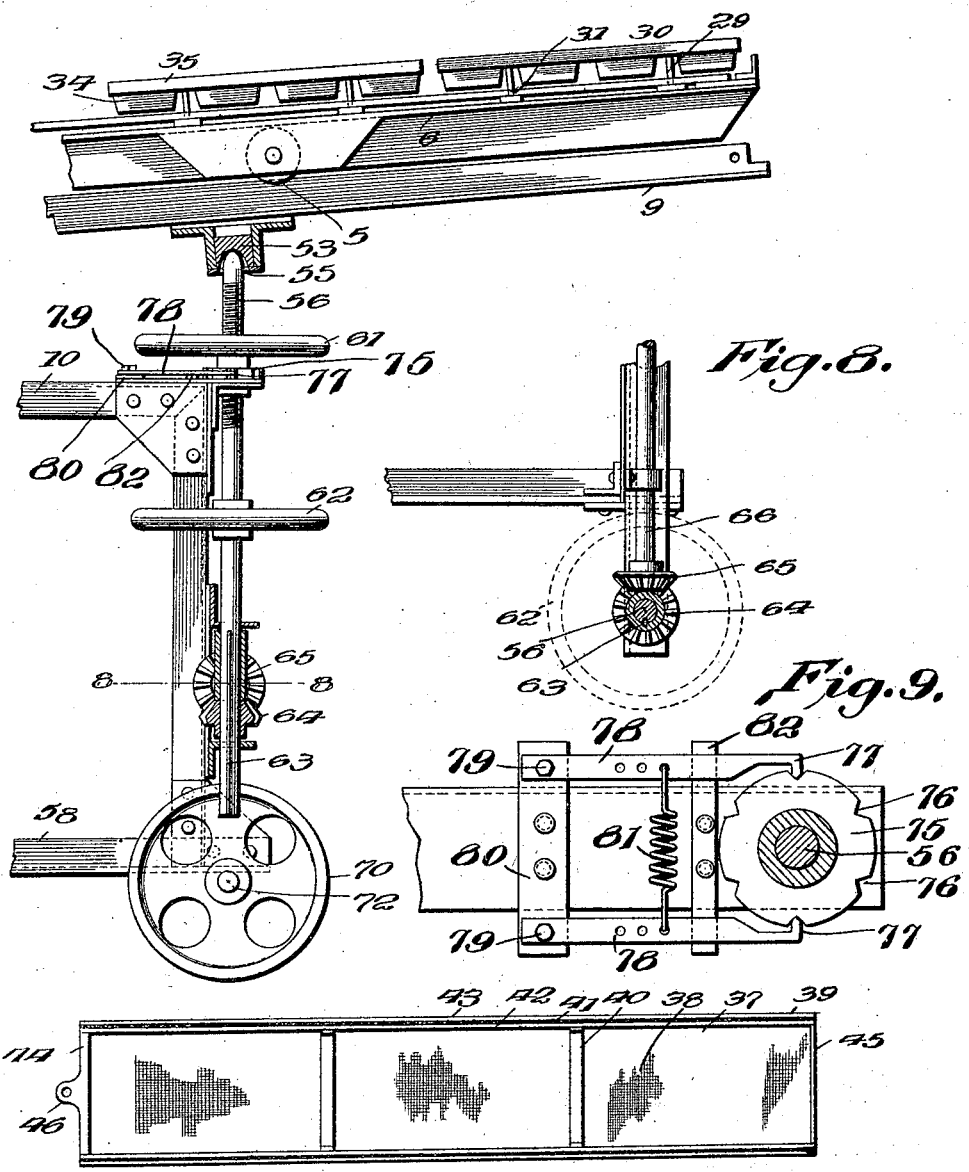

UNITED STATES PATENT OFFICE.

GEORGE MUELLER, OF SALT LAKE CITY, UTAH.

BAKER'S OVEN.

1,413,867. Specification of Letters Patent. Patented Apr. 25, 1922.

Application filed August 23, 1920. Serial No. 405,362.

*To all whom it may concern:*

Be it known that I, GEORGE MUELLER, a citizen of the United States, residing at Salt Lake City, in the county of Salt Lake and State of Utah, have invented new and useful Improvements in Bakers' Ovens, of which the following is a specification.

The invention relates to a baker's oven.

The object of the invention is to improve the construction of bakers' ovens and to provide a simple, practical and comparatively inexpensive construction adapted to eliminate the hard labor incident to peeling in and out of a hot brick bake oven and capable of enabling a large batch of loaves to be quickly placed in the oven and removed therefrom even more rapidly and adapted to produce a product equally as good as that resulting from hand peeling and very much the same principle of handling the loaves or rolls and the like.

A further object of the invention is to provide a baker's oven of this character in which the dough may be introduced into the oven and the baked product removed therefrom by an operator having but little experience and thereby obviating the necessity of employing an expert baker or peelman for such purpose.

The invention also has for its object to provide a bake oven in which comparatively little floor space will be consumed by the apparatus for handling the pans or other material in which the dough is placed and which will permit the pans to be arranged close to the floor of the oven, say within one-half inch of the top of the floor, thereby giving the bread or other dough the full benefit of the heat of the oven bottom.

The invention does away with the old wooden peels and provides a tray or truck adapted to take care, in a better way and more economically, the work performed by the wooden peels.

A further object of the invention is to provide means for enabling a truck carrying a wheeled tray to be securely connected to the furnace in position to provide an extension or continuation of the track of the oven so that the wheeled tray may be quickly run into and out of the oven.

Another object of the invention is to provide a baker's oven having the said oven truck and wheeled oven tray and adapted to be advantageously employed by the small baker as well as in large establishments and capable of enabling the small baker to operate his bakery comparatively economically and efficiently as a large bakery or plant.

With these and other objects in view, the invention consists in the construction and novel combination of parts hereinafter fully described, illustrated in the accompanying drawings and pointed out in the claims hereto appended, it being understood that various changes in the form, proportion, size and minor details of construction, within the scope of the appended claims, may be resorted to without departing from the spirit of the invention or sacrificing any of the advantages thereof.

In the accompanying drawings, in which like numerals of reference designate corresponding parts in the several figures:—

Figure 1 is a side elevation partly in section of an oven, oven truck and oven tray constructed in accordance with this invention.

Figure 2 is a transverse sectional view of the oven.

Figure 3 is an enlarged side elevation of the oven truck and wheeled oven tray.

Figure 4 is a plan view of the same.

Figure 5 is an enlarged plan view of the coacting rails of the oven truck showing the same slightly separated.

Figure 6 is a side elevation of the same.

Figure 7 is an enlarged vertical sectional view of a portion of the wheeled tray illustrating the manner of adjusting the same for supporting the pans.

Figure 8 is a horizontal sectional view of the same on the line 8—8 of Fig. 7.

Figure 9 is a detail view illustrating the device for holding the adjusting nuts of the side adjusting screws stationary while the screws are simultaneously adjusted by the connecting gearing.

Fig. 10 is a detail view of a biscuit tray.

In the accompanying drawings in which is illustrated one embodiment of the invention, 1 designates the baking chamber of a baker's oven provided at opposite sides with narrow grooves or channels 2 for the reception of rails 3 designed to be constructed of steel or other suitable material and housed within approximately U-shaped casings or housings 4 of cast iron or other material adapted to withstand the heat of the oven without warping or burning it. The U-shaped casings preferably consist of bottom U-shaped member $4^a$ and side plates fitted between the U-shaped members and the side walls of the grooves or channels but a single integral casing or housing may be employed if desired. The rails 3 are preferably inverted T-rails and consist of a horizontal base and a central vertical longitudinal web adapted to receive wheels 5 of a pan carrying tray 6 and the rails 3 terminate short of the top of the casing or housing 4 so as to be fully protected by the same. The grooves or channels 2 are rectangular in cross section and the casings or housings 4 are approximately U-shaped and are composed of parallel side walls and a horizontal connecting bottom. The bottom extends entirely across the groove or channel and is arranged upon the bottom of the same while the side walls terminate short of the top of the grooves or channels. The casings or housings line the bottom and sides of the grooves or channels as clearly shown in Figure 2 of the drawings.

The grooves or channels and the casings or housings are shown at a slight inclination in Figure 1 of the drawings but they may be horizontal as will be readily understood and the inclination may be varied as desired. The rails and the channeled casings or housings are provided at the front of the oven with extensions 7 and 8 which project beyond the oven and which are adapted to have connected to them rails 9 of an oven truck 10. The rails 9 of the oven truck are inverted T-shape and the terminal portions of the webs are cut away at the top at 11 to provide recesses to receive upper projecting portions 12 of the extensions 7 of the rails 3. The extensions 7 are cut away at the base at 13 to receive the projecting base portion 14 of the rails 9. The extensions 7 are also provided with side plates 15 riveted or otherwise secured to the side faces of the webs of the extensions 7 and having outer spaced parallel portions 16 and outer terminal diverging portions 17 adapted to guide the rails of the oven truck into the narrow spaces between the parallel portions 16 of the side plates 15. The parallel portions 16 and the webs of the oven truck rails 9 are provided with registering perforations 18 and 19 adapted to receive suitable fastening means for enabling the rails of the oven truck to be securely fastened to the rails of the oven. By this construction the truck constitutes practically a portion of the oven in the handling of the wheeled trays and after a tray has been introduced into the oven the truck may be transferred to another oven or left in position for the removal of the tray, as desired. A single truck will enable a large number of loaves to be quickly handled and the loaves may be quickly placed on the tray. It has been found in practice that a wheeled tray, handling between 200 and 250 loaves, only one-half of a minute is required for introducing the tray into the baking chamber and that less time is required for the removal of the tray.

The oven is preferably provided with an automatically closable counter-balanced door 20 hinged at the top at 21 and provided thereat with an upwardly projecting arm or arms 22 having an adjustable weight 24 for enabling the weight to be arranged in position so that the door will overbalance the weight and close automatically. The weight is designed to partially counter-balance the door and enable an easy operation of the same in both the opening and closing movements. The floor of the oven is cut away at 25 to provide a clearance for the swinging door and also to form a shoulder or stop 26 for the same. The wheels of the tray are preferably ball bearing but any anti-friction wheels or wheels of any construction may of course be employed and the said tray comprises an open rectangular frame composed of side bars 27 and connecting end bars 28 and having adjustable pan supporting bars 29 mounted upon the said side bars and extending entirely across the frame of the tray. The pan supporting bars 29 are preferably inverted T-shape and are provided in their webs with lower terminal recesses 30 adapted to receive adjusting and locking strips or members 31 and engaging recesses 32 thereof. The locking bars 31 which are arranged horizontally at opposite sides of the wheeled tray have the said notches 32 cut in their inner edges for engaging the webs of the pan supporting bars or rails and the said adjusting bars are detachably secured to the frame of the tray by bolts 33 or other suitable fastening means. Any suitable means may be employed for enabling the strips or members 31 to be detachably mounted on the side bars of the tray and the arrangement of the pans may be reversed if desired as the bars 29 can extend longitudinally as well as transversely of the tray.

The pans 34 which are spaced apart are connected in sets by end bars 35 and they are spaced apart to permit the end bars to rest upon the upper edges of the vertical portions of the T-shaped supporting bars 29. The pans are hung from the supporting bars and are arranged so that when the tray is run into the furnace the bottoms of the pans will just clear the floor of the oven, one-quarter of an inch clearance being preferably provided as the arranging of the pans in such close relation with the floor of the oven will subject the contents of the pans to the entire heat of the oven floor with practically the same heating effect as when the pans are placed directly upon the floor of the oven. The wheels of the tray are preferably flanged as shown to form grooves to receive the rails of the oven truck and oven and they may be mounted in any suitable brackets or supports 36.

The pans 34 may be of any desired construction and the supporting bars 29 are also adapted to receive biscuit or bread trays 37 having a wire mesh bottom 38 adapted for the baking of biscuits, rolls and the like and the wire mesh bottom will enable the contents of the biscuit or bread trays to bake as quickly as if they were lying upon the bottom of the oven. The wire mesh pan or tray is adapted to avoid the labor of peeling the rolls or biscuits by hand on a wooden peel holding from 10 to 25 rolls and requiring from 15 to 25 minutes to peel an oven full. By employing the wheeled tray and the screen or perforated bottom pans or trays, an entire oven full of rolls, bread or the like may be introduced into an oven or removed therefrom within the space of one-half a minute.

Each of the foraminous bottom pans or trays is composed of angle side bars 39 and connecting cross bars 40, the marginal portions 41 of the bottoms 38 being extended upwardly at the inner faces of the side bars and clamped between the same and inner bars of members 42. The side bars have their terminal portions 43 bent upwardly at an oblique angle to form runners of the side bars and enable the pans to slide in and out of the tray without the terminals of the side bars digging into the supporting surfaces and interfering with the rapid sliding movement of the trays or pans. The terminals of the side bars are connected by end cross bars 44 and 45, one or both of the bars being provided with a central projecting ear 46 adapted to be engaged by a hook for facilitating the rapid handling of the pans or trays. The wings or flanges of the angle side bars 39 are arranged vertically as shown and the inner side bars or members 42 reinforce and stiffen the sides of the pans or trays and enable the same to be made of considerable length as shown in the drawings. The biscuits or roll pans or trays preferably extend about one-half the width of the wheeled tray and they may be made of any desired length to provide pans or trays of the required capacity. The rails 9 of the oven truck are preferably connected by transverse angle bars 47 and the said rails 9 are provided with pivoted stops 48 preferably consisting of approximately L-shaped plates or members pivoted at their angles at 49 and having upwardly extending arms or portions 50 for engaging the brackets or other portions of the wheeled tray to retain the same on the oven truck. The stop plates which also have inwardly extending arms 51 are provided with perforations 52 adapted to receive pins or bolts for securing the pivoted stops in the full line position shown in Figure 3 of the drawings and also adapted when removed to permit the pivoted stops to be swung downward to the dotted line position for removing the wheeled tray from the oven tray. The angle bars 47 have spaced parallel depending wings or flanges between which are mounted blocks 53 and 54 provided in their lower faces with sockets 55 for the reception of double and single adjusting screws 56 and 57 mounted on the trunk frame 58 and located respectfully at opposite sides of one end of the same and centrally of the other end thereof as clearly indicated in the drawings. The double adjusting screws 56 which are mounted in suitable brackets 59 are engaged by adjustable nuts 61 having hand wheels and suitably mounted on the truck frame. The hand wheels which are located at the top of the truck frame are adapted for independent adjustment to enable the double adjusting screws to be independently adjusted to set the rails properly with relation to each other and the said screws 56 are also connected by the gearing hereinafter described and are provided with a hand wheel 62 for enabling the double adjusting screws to be simultaneously operated for adjusting the rails of the oven truck to arrange them properly with relation to the rails of the oven. The lower portions of the double adjusting screws are provided with feathers 63 which operate in suitable key ways of bevel pinions 64 which mesh with bevel pinions 65 of a transverse shaft 66 journaled in suitable bearings of the oven truck frame and extending across the same to arrange the gears 65 in proper position to mesh with the gears 64 of the double adjusting screws.

The adjustable nuts 61 are provided with suitable locking means for holding them against rotary movement after adjustment and the single adjusting screw 57 engages a fixed nut 67 and is mounted in suitable brackets 68 and is provided with a hand wheel 69 for adjusting the said screw 57. By adjusting the screws the rails of the oven truck may be arranged either in a horizontal position or at an inclination and also at an elevation in the range of the adjustment of the screws.

The truck frame is mounted at one end upon side wheels 70 and at the other end on a caster wheel 71. The side wheels are connected by an axle 72 and the caster wheel 71 is mounted in a pivoted bracket 73 or other suitable means to permit the wheel 71 to perform the function of a caster wheel in the handling of the oven truck. A base 74 is provided at the center of the caster wheel end of the frame for the mounting of the caster wheel bracket or support.

The device for holding the end wheel or nut 61 stationary while the side screws 56 are simultaneously adjusted comprises a cog wheel 75 preferably formed integral with the end wheel 61 but it may be connected with the end wheel in any other desired manner. The cog wheel is provided at intervals with oppositely beveled recesses 76 adapted to be engaged by inwardly extending teeth 77 of side levers 78 pivoted at one end at 79 to a suitable supporting bar or member 80 and connected intermediate of their ends by a coiled spring 81 which urges the ratchet levers 78 inwardly and maintains the same in engagement with the cog or ratchet wheel 75. The free portions of the levers 78 are preferably supported upon a transverse member 82 but the levers may be mounted in any other desired manner as may be readily understood. The teeth or engaging portions 77 of the levers are oppositely beveled to fit the notches of the cog or ratchet wheel and they engage the cog or ratchet wheel with a sufficient gripping action to hold the same stationary during the simultaneous adjustment of the side screws and at the same time they will permit an independent adjustment or rotary movement of the end wheels 61 and the side screws when power is applied to the said end wheel 61 with sufficient force to rotate the same.

What is claimed is:—

1. The combination of a baker's oven provided at opposite sides with grooves or channels, metallic casings or housings lining the sides and bottoms of the grooves or channels, and rails arranged within the casings or housings and located sufficiently below the top of the floor of the oven to permit the wheels of a tray to be located substantially entirely within the grooves or channels, whereby the bottom of the tray may be arranged in close proximity to the floor of the oven.

2. The combination of a baker's oven provided at opposite sides with grooves or channels, metallic casings or housings lining the sides and bottoms of the channels and terminating short of the tops of the same, and inverted T-shaped rails arranged within the casings or housings and extending across the same and provided with central vertical webs located sufficiently below the top of the floor of the oven to permit the wheels of a tray to be located substantially entirely within said grooves or channels whereby the bottom of the tray may be arranged in close proximity with the floor of the oven.

3. The combination of a baker's oven provided at opposite sides with grooves or channels, casings or housings located within the grooves or channels and composed of side plates or members lining the side walls of the grooves or channels and approximately U-shaped bottom members fitted between the side plates or members, and inverted T-shaped rails located within the housings, said rails being located sufficiently below the top of the floor of the oven to permit the wheels of a tray to be located substantially entirely within said grooves or channels, whereby the bottom of the tray may be arranged in close proximity with the floor of the oven.

4. The combination of a baker's oven provided at opposite sides with grooves or channels, housings arranged within the grooves or channels, a tray extending across the bottom of the oven and mounted on the said rails and provided with means for supporting pans or receptacles in close proximity and spaced relative to the floor of the oven, said means including wheels located substantially wholly within the said grooves or channels.

5. The combination of an oven provided in its floor with grooves or channels located at opposite sides of the oven, casings or housings arranged wholly within the grooves or channels, rails mounted within the casings or housings and terminating short of the top of the floor of the oven, a tray extending across the floor of the oven and having wheels arranged on the said rails and located substantially wholly within the grooves or channels, said tray being provided at intervals with supporting bars, and pans or receptacles arranged on the supporting bars with their bottoms in close proximity to and spaced from the floor of the oven.

6. A baker's oven provided at opposite sides with rails located below the surface of the floor of the oven and having extensions projecting beyond the oven, an oven truck provided with rails, means for attaching the rails of the oven truck to the extensions of the rails of the oven and forming a continuous track extending along the truck and the oven floor, and a wheeled tray carried by the truck and arranged to run on the said rails and movable into and out of the oven.

7. The combination of an oven provided with rails having extensions projecting from the oven, said rails being inverted T-shaped and provided at opposite sides with plates having spaced portions provided with divergent terminals, a truck provided with rails having portions arranged to fit between the spaced portions of the said plates and adapted to be guided into the spaces between the said plates by the divergent portions thereof, means for retaining the rails of the oven truck between the said rails, and a wheeled tray arranged to run on the said rails into and out of the oven.

8. The combination of an oven provided at opposite sides with inverted T-rails having extensions projecting beyond the oven, said extensions being recessed at the base, an oven truck provided with inverted T-rails recessed at the top to fit the recesses of the oven rails and plates secured to the sides of the oven rails and having spaced projecting lugs receiving the oven truck rails and having terminal divergent guiding portions.

9. The combination with a baker's oven, of a tray provided at intervals with inverted T-shaped supporting bars, spaced hands or receptacles located between the said supporting bars, and bars connecting the pans or receptacles and maintaining the same in their spaced relation and arrangement upon the said supporting bars and suspending the pans or receptacles in close proximity to the floor of the oven.

10. The combination of a baker's oven provided at opposite sides of its floor with between grooves or channels, housings arranged in the grooves or channels below the top of the floor, a wheeled tray mounted upon the rails and having wheels located substantially entirely within the said grooves or channels and provided at intervals with T-shaped supporting bars, pans or receptacle, and bars connecting the pans or receptacles and maintaining the same in spaced relation and arranged upon the said supporting bars and suspending the pans or receptacles in close proximity to and in spaced relation with the floor of the oven.

In witness whereof, I have hereunto affixed my signature.

GEORGE MUELLER.